June 11, 1974 H. SIDI ET AL 3,816,523
PROCESS FOR THE PRODUCTION AND PURIFICATION OF BENZOIC ACID
Filed Oct. 11, 1968
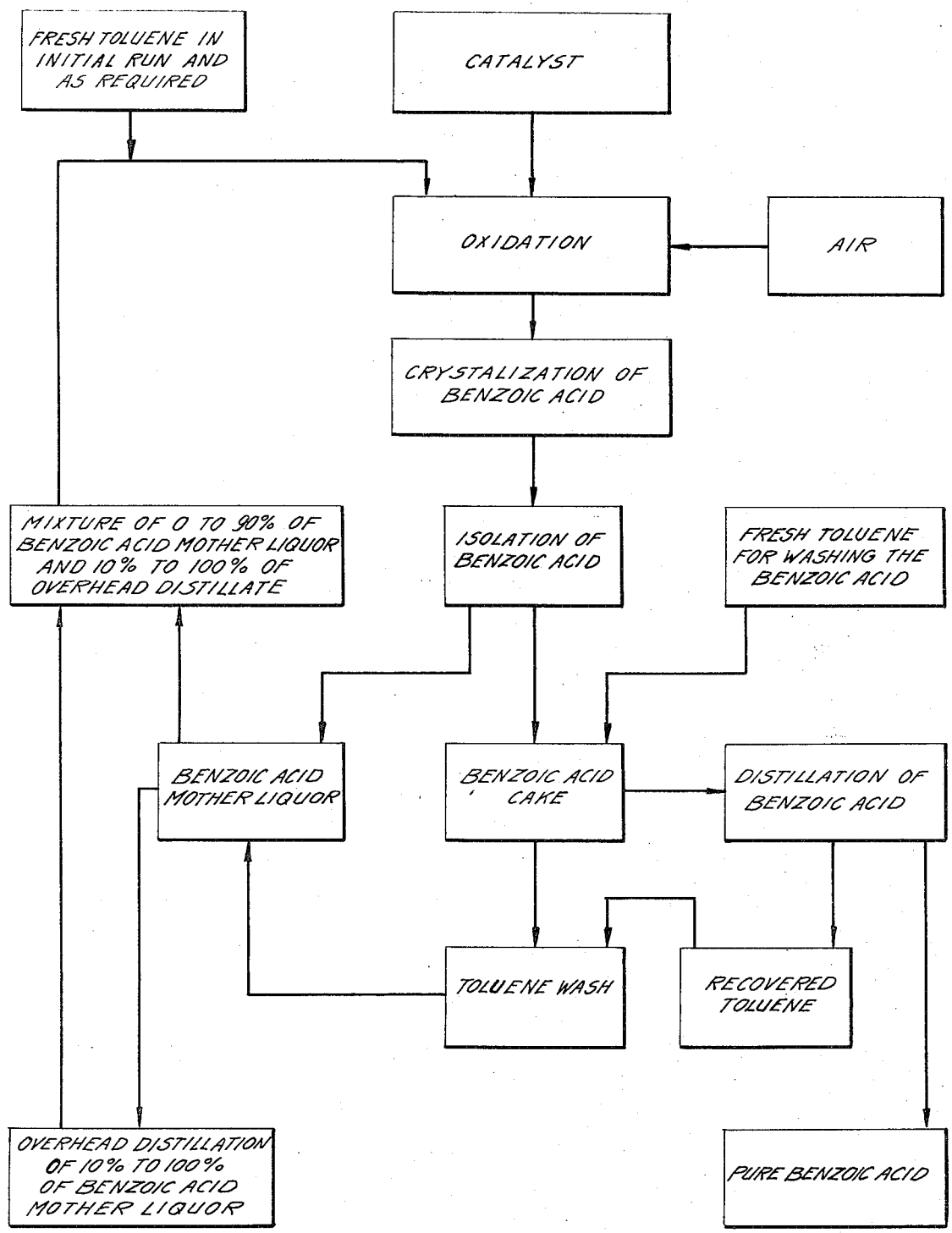
INVENTORS.
HENRI SIDI
MICHAEL SIDEY

United States Patent Office 3,816,523
Patented June 11, 1974

3,816,523
PROCESS FOR THE PRODUCTION AND PURIFICATION OF BENZOIC ACID
Henri Sidi, Paramus, and Michael Sidey, Garfield, N.J., assignors to Tenneco Chemicals, Inc.
Filed Oct. 11, 1968, Ser. No. 766,835
Int. Cl. C07c 63/02
U.S. Cl. 260—524 R         9 Claims

ABSTRACT OF THE DISCLOSURE

Products containing at least 99.8% of benzoic and little or no high boiling impurities are obtained by a process in which toluene is oxidized until about 25% to 45% of it is converted to benzoic acid, the benzoic acid is crystallized from the reaction mixture, and after washing with toluene the crystalline benzoic acid is distilled. From 10% to 100% of the combined mother liquor and toluene washes is purified by distillation before being recycled.

---

This invention relates to a process for the production and purification of benzoic acid. More particularly, it relates to an integrated process for the conversion of toluene to benzoic acid by catalytic liquid phase air oxidation, crystallization of benzoic acid from the oxidation mixture, and distillation of the crystallized benzoic acid which yields products of very high purity.

Benzoic acid produced by the oxidation of toluene with an oxygen-containing gas in the presence of a heavy metal oxidation catalyst is normally contaminated with impurities which may be derived from impurities in the feedstock or formed as products of secondary reactions. Such impurities include benzaldehyde, benzyl alcohol, esters of benzoic acid, diphenyls, p-phenylbenzoic acid, phthalic anhydride, and related compounds which have vapor pressures and solubilities close to those of benzoic acid and are consequently difficult to remove from the product by any of the previously known procedures. Contaminants of this type are highly undesirable because they cause the product to be unsatisfactory with respect to color and odor and because they may interfere in chemical conversions in which the benzoic acid is used as a reactant.

In accordance with this invention, it has been found that a product that contains at least 99.8 percent of benzoic acid and little or no contaminants that boil at approximately the same temperature as benzoic acid or at higher temperatures can be prepared in a nearly quantitative yield by an integrated process in which toluene is converted to benzoic acid by catalytic liquid phase air oxidation, benzoic acid is crystallized from the oxidation mixture, and the crystalline benzoic acid is distilled. From 10 percent to 100 percent of the combined mother liquid-toluene washes is distilled to separate its volatile components from the catalyst and high boiling impurities before the mother liquor is recycled to the reactor.

For a more complete understanding of the invention, reference should be made to the accompanying drawing, which is a block diagram illustrating the various essential sequential steps and other features of this process for the preparation and purification of benzoic acid.

The process of this invention is generally carried out as an integrated series of runs in which the starting material for each run after the first is the combined mother liquor-toluene washes from the preceding run, a portion or all of which has been distilled to separate the unreacted toluene and other volatile compounds from the catalyst and high boiling impurities. In this way, a series of sixteen or more runs can be carried out in which the yield and quality of the benzoic acid obtained from the final run are not substantially different from those obtained from the initial runs.

In the oxidation step of the process, toluene or the purified mother liquor from a preceding run is introduced into a reactor. An oxygen-containing gas, which is preferably air, is introduced into the bottom of the reactor and is allowed to bubble through the toluene feedstock. The conversion of toluene to benzoic acid is effected in the presence of a heavy metal oxidation catalyst, such as cobalt acetate, cobalt octoate, cobalt benzoate, cobalt naphthenate, manganese acetate, manganese octoate, and the like. The amount of catalyst used is generally in the range of about 0.01 percent to 5 percent or more and preferably about 0.1 percent to 1 percent of the weight of toluene present in the reactor. The oxidation reaction is effected at a temperature in the range of about 130° C. to 200° C., preferably 150° C. to 175° C., at a pressure sufficient to maintain liquid phase reaction conditions, that is about 20 p.s.i. to 100 p.s.i., and preferably 50 p.s.i. to 75 p.s.i.

If a product having the desired quality is to be obtained, the reaction should be terminated when about 25 percent to 45 percent and preferably about 35 percent of the toluene has been converted to benzoic acid During the oxidation, a vapor stream containing inert gases, toluene, and water is removed from the reactor, cooled to condense toluene, passed through a water separator and a column packed with carbon, and then discarded.

The reaction mixture is cooled to 80°–90° C. and removed from the reactor. After the addition of the toluene that collected in the carbon column, the reaction mixture is heated to redissolve any precipitated solids and then cooled to a temperature below 50° C. and preferably to room temperature with stirring to precipitate crystalline benzoic acid. The benzoic acid is separated from the mother liquor by centrifugation, filtration, or other solid liquid separating technique. The benzoic acid cake is washed with fresh toluene and dried.

The crystalline benzoic acid is further purified by distilling it at a pressure in the range of about 50 mm. to 760 mm., and preferably about 100 mm. Highest yields of distilled benzoic acid are obtained when each batch of crystalline benzoic acid is added to the residue from a previous distillation before being distilled.

As has been indicated, the mother liquor obtained when the crystalline benzoic acid was separated is combined with the toluene washes and subjected to some purification before it is returned to the reactor and subjected to oxidation. The purification can be carried out by any suitable and convenient procedure that removes from it at least a portion of the high boiling impurities and catalyst. One procedure that gives excellent results involves separating the combined liquor into two portions, each of which comprises about 10 percent to 90 percent of the liquor. The first portion is returned without purification to the reactor. The second portion is distilled first at atmospheric pressure and then at about 50 mm. to 200 mm. to a temperature of about 200° C. to 225° C. to separate a fraction containing unreacted toluene, benzoic acid, and volatile impurities from the residue that contains the catalyst and higher boiling impurities. The volatile fraction and an amount of fresh catalyst equivalent to that in the distillation residue are then charged into the reactor. Particularly satisfactory results are obtained when about half of the mother liquor is returned to the reactor without purification and the other half is purified by distilling it first under atmospheric pressure and then at a pressure of about 100 mm. to 210° C. When the mother liquor is treated in this way, a series of sixteen or more runs can be made without significant change in the yield and quality of benzoic acid obtained or in the amount of non-volatile impurities in the mother liquor.

If desired, all of the mother liquor can be purified by this procedure before it is recycled. When the mother liquor is not purified before it is returned to the reactor, only three or four runs can be carried out before the amount of impurities in it increases to the point where product isolation and washing become difficult and the product, which is obtained in a reduced yield, has an unsatisfactorily low benzoic acid content. Treatment of the mother liquor with such adsorbents as carbon, alumina, and diatomateous earth removes some of the impurities but does not remove the diphenyls, benzyl benzoate, and other high-boiling impurities from it. After four or five runs, the adsorbent-treated mother liquors contain amounts of these impurities that reduce the yield and quality of the product. The proportion of the mother liquor that must be purified by distillation can, if desired, be reduced by treating a portion of the mother liquor with an adsorbent.

The invention is further illustrated by the examples that follow. In these examples, all percentages are percentages by weight.

EXAMPLE 1

A series of runs was carried out using the following procedure:

(a) In the first run 1500 grams of toluene and 6 ml. of cobalt octoate catalyst were charged into a stainless steel reactor that had a diameter of 1.5 inches and a height of 7 feet. While air was bubbled through the reaction mixture at the rate of 2.5 cubic feet per hour under a pressure of 55 pounds per square inch, its temperature was raised to 150°–155° C. Inert gas and vapors were withdrawn from the reactor and passed through a water separator that contained 270 ml. of toluene and then through a column containing active carbon. When about 35 percent of the toluene had been converted to benzoic acid, the addition of air was discontinued, and the reaction mixture was cooled to 80°–90° C. The reaction mixture was removed from the reactor, heated to dissolve the precipitated solids, and then cooled to room temperature with stirring to crystallize the benzoic acid. The benzoic acid was isolated, washed with toluene, and dried.

The benzoic acid mother liquor was combined with the toluene wash. Half of this mother liquor was distilled first at atmospheric pressure and then under 100 mm. pressure to 210° C. The distillate, the undistilled portion of the mother liquor, and 3 ml. of cobalt octoate catalyst were charged to the reactor for the first recycle run.

(b) A series of recycle runs was carried out in which the recovered and partially purified benzoic acid mother liquor from a previous run was oxidized until about 35 percent of the toluene was converted to benzoic acid, the benzoic acid was crystallized from the reaction mixture and then distilled, and the mother liquor was partially purified. A typical run in this series was carried out as follows: Into the reactor described in (a) were charged 750 grams of unpurified benzoic acid mother liquor from the preceding run, 688 grams of distillate obtained from the distillation of 750 grams of the benzoic acid mother liquor, and 3 ml. of cobalt octoate catalyst. The water separator was filled with 270 ml. of toluene. While air was bubbled through the reaction mixture at the rate of 2.5 cubic feet per hour, the temperature of the reaction mixture was raised to 150°–155° C., and this temperature was maintained until 35 percent of the toluene in the reaction mixture had been converted to benzoic acid. During this time, 71 ml. of water was collected in the water separator. The reaction mixture, which was cooled to 80°–90° C. and removed from the reactor, weighed 1529 grams. The 24 grams of toluene collected in the carbon adsorber column was added to the reaction mixture. The reaction mixture was heated to dissolve the precipitated solids and then cooled to room temperature with stirring to crystallized benzoic acid. The acid was isolated on a rotary filter and washed with toluene. After drying under vacuum, there was obtained 344 grams of dry benzoic acid. The combined mother liquor and toluene wash weighed 1561.5 grams. Half of it (780.5 grams) was distilled first at atmospheric pressure and then at 100 mm. pressure to yield 679 grams of distillate. This distillate and the other half of the mother liquor were charged to the reactor for the next recycle run. The amounts of crystalline benzoic acid obtained in seven runs and the analysis of this material are set forth in Table I.

TABLE I

[Series of runs for the preparation of crystalline benzoic acid in which 50% of the benzoic acid mother liquor was purified prior to recycling]

| Run number | Amount of benzoic acid isolated (grams) | Analysis of product by vapor phase chromatography, percent | | | |
|---|---|---|---|---|---|
| | | Benzoic acid | Toluene | Diphenyls | Benzyl benzoate |
| 1 | 426.0 | 99.86 | 0.09 | Trace | 0.03 |
| 2 (recycle) | 356.6 | 99.60 | 0.13 | 0.05 | 0.13 |
| 3 (recycle) | 344.0 | 99.79 | 0.10 | 0.04 | 0.04 |
| 4 (recycle) | 401.5 | 99.81 | 0.09 | 0.01 | 0.01 |
| 5 (recycle) | 330.0 | 99.86 | 0.11 | | 0.02 |
| 6 (recycle) | 350.0 | 99.76 | 0.10 | 0.05 | 0.05 |
| 7 (recycle) | 357.5 | 99.79 | 0.13 | Trace | 0.02 |

One hundred gram portions of the products of Runs 1–7 were combined and then distilled at 100 mm. pressure in a flask equipped with a 12-plate packed column surmounted by a variable reflux head. A forecut of 22 grams was taken at a 1:1 reflux ratio. The main cut, which was taken at a 9:1 reflux ratio, weighed 580.0 grams and was distilled at 185°–187° C./100 mm. A residue of 87 grams remained in the flask. The material balance over the distillation step was 98.2%. The main cut distilled product had the following characteristics:

Analysis (by vapor phase chromatography) (percent):
  Benzoic acid _____ 99.93
  Toluene _____ 0.07
  High boiling impurities _____ <0.005
Assay (by titration) (percent) _____ 100.2
APHA color _____ 5
Heat stability (2 hours at 220° C.):
  Initial APHA color _____ 50
  Final APHA color _____ 80

EXAMPLE 2

Using the procedures described in Example 1, a series of runs was carried out in which recovered benzoic acid mother liquors, 50% of which had been purified by distillation, were oxidized at 150°–155° C. using air at the rate of 2.5 cubic feet per hour at a pressure of 55 pounds per square inch until 35% of the toluene was converted to benzoic acid. The amounts of crystallized benzoic acid recovered in sixteen consecutive runs and the analysis of these products are set forth in Table II.

TABLE II

[Series of runs for the preparation of crystalline benzoic acid in which 50% of the mother liquor was purified prior to recycling]

| Run number | Amount of benzoic acid isolated (grams) | Analysis of product by vapor phase chromatography, percent | | | |
|---|---|---|---|---|---|
| | | Benzoic acid | Toluene | Diphenyls | Benzyl Benzoate |
| 1 | 342.0 | 99.75 | 0.15 | 0.02 | 0.06 |
| 2 (recycle) | 356.5 | 99.84 | 0.10 | 0.01 | 0.01 |
| 3 (recycle) | 377.0 | 99.48 | 0.18 | 0.02 | 0.05 |
| 4 (recycle) | 405.5 | 99.43 | 0.20 | 0.01 | 0.03 |
| 5 (recycle) | 318.0 | 99.54 | 0.04 | 0.20 | 0.13 |
| 6 (recycle) | 342.0 | 99.97 | | 0.01 | 0.02 |
| 7 (recycle) | 289.0 | 99.50 | 0.16 | 0.03 | 0.01 |
| 8 (recycle) | 272.0 | 99.79 | 0.15 | 0.01 | 0.02 |
| 9 (recycle) | 399.0 | 99.41 | 0.09 | 0.21 | 0.21 |
| 10 (recycle) | 370.0 | 99.69 | 0.11 | 0.03 | 0.11 |
| 11 (recycle) | 364.0 | 99.78 | 0.16 | 0.02 | 0.03 |
| 12 (recycle) | 352.5 | 99.71 | 0.08 | <0.01 | 0.04 |
| 13 (recycle) | 352.0 | 99.61 | 0.06 | <0.01 | 0.03 |
| 14 (recycle) | 349.0 | 99.63 | 0.09 | 0.03 | 0.06 |
| 15 (recycle) | 347.0 | 99.61 | 0.07 | 0.03 | 0.06 |
| 16 (recycle) | 360.0 | 99.32 | 0.11 | 0.06 | 0.16 |

One hundred gram portions of the products of the first seven runs in this series were added to the 87 gram residue of the distillation of Example 1. The resulting mixture was distilled by the procedure described in Example 1. The main cut, which was obtained in a recovery of 100%, had the following characteristics:

*Analysis* (by vapor phase chromatography) (percent):

| | |
|---|---:|
| Benzoic acid | 99.84 |
| Toluene | 0.08 |
| Diphenyls | 0.02 |
| Benzyl benzoate | 0.01 |
| Assay (by titration) (percent) | 99.95 |
| APHA color | 5 |
| Heat stability (2 hours at 220° C.): | |
| Initial APHA color | 60 |
| Final APHA color | 100 |

Samples of the mother liquors obtained from each of the runs in this series were analyzed. The amounts of reaction by-products in these samples are set forth in Table III.

TABLE III

[Reaction by-products based on toluene-free benzoic acid mother liquors after each of the runs]

| Mother liquor obtained from run | Analysis of toluene-free benzoic acid mother liquor percent | | | | | | |
|---|---|---|---|---|---|---|---|
| | Benzaldehyde | Benzyl alcohol | Phthalic anhydride | 2-methyl-diphenyl | 3-methyl-diphenyl | Benzyl benzoate | Unknowns |
| 1 | 3.2 | 0.5 | 0.2 | 0.5 | 0.5 | 2.9 | 1.0 |
| 2 | 3.0 | 0.3 | 0.3 | 1.1 | 0.6 | 4.4 | 1.4 |
| 3 | 2.6 | 0.5 | 0.4 | 1.5 | 0.9 | 0.2 | 1.0 |
| 4 | 2.6 | 0.4 | 0.6 | 2.1 | 1.0 | 2.4 | 0.4 |
| 5 | 3.2 | 0.4 | 0.6 | 2.2 | 1.1 | 0.5 | 1.3 |
| 6 | 3.3 | 0.3 | 0.6 | 2.6 | 1.1 | 0.5 | 0.9 |
| 7 | 4.0 | 1.6 | 0.8 | 2.7 | 1.1 | 0.4 | 1.2 |
| 8 | 3.1 | 0.4 | 0.9 | 2.8 | 1.1 | 2.0 | 0.2 |
| 9 | 3.1 | 0.4 | 0.8 | 2.6 | 0.9 | 0.6 | 1.0 |
| 10 | 3.0 | 0.5 | 0.8 | 1.9 | 0.5 | 3.7 | 1.3 |
| 11 | 3.1 | 0.7 | 0.6 | 1.6 | 0.4 | 5.0 | 1.4 |
| 12 | 2.6 | 0.4 | 0.6 | 1.7 | 0.4 | 3.5 | 1.2 |
| 13 | 3.0 | 0.2 | 0.5 | 1.7 | 0.4 | 2.0 | 1.6 |
| 14 | 3.4 | 0.4 | 0.6 | 1.8 | 0.5 | 3.0 | 1.6 |
| 15 | 3.1 | 0.3 | 0.6 | 1.9 | 0.7 | 2.4 | 2.4 |
| 16 | 3.0 | 0.2 | 0.5 | 2.3 | 0.8 | 1.7 | 3.7 |

EXAMPLE 3

Using the procedures described in Example 1, a series of runs was carried out in which recovered mother liquors, 50% of which had been purified by distillation, were oxidized at 150°–155° C. using air at the rate of 2.5 cubic feet per hour at a pressure of 55 pounds per square inch until 29 percent of the toluene was converted to benzoic acid. The amounts of crystalline benzoic acid recovered in eighteen consecutive runs and the analysis of the products are set forth in Table IV.

Distillation of the products of these runs by the procedure described in Examples 1 and 2 gave nearly quantitative yields of products that contained at least 99.9 percent of benzoic acid and substantially no high boiling impurities.

TABLE IV

[Series of runs for the preparation of crystalline benzoic acid in which 50% of the benzoic acid mother liquor was purified prior to recycling]

| Run number | Amount of benzoic acid isolated (grams) | Analysis of product by vapor phase chromatography, percent | | | |
|---|---|---|---|---|---|
| | | Benzoic acid | Toluene | Diphenyls | Benzyl benzoate |
| 1 | 313.0 | 99.86 | 0.06 | 0.01 | 0.06 |
| 2 (recycle) | 334.0 | 99.88 | 0.05 | <0.01 | 0.05 |
| 3 (recycle) | 335.0 | 99.83 | 0.07 | 0.01 | 0.06 |
| 4 (recycle) | 349.0 | 99.82 | 0.08 | 0.02 | 0.06 |
| 5 (recycle) | 357.0 | 99.80 | 0.08 | <0.01 | 0.06 |
| 6 (recycle) | 366.0 | 99.66 | 0.09 | 0.02 | 0.08 |
| 7 (recycle) | 374.9 | 99.48 | 0.12 | 0.07 | 0.23 |
| 8 (recycle) | 338.0 | 99.80 | 0.09 | <0.01 | 0.06 |
| 9 (recycle) | 337.0 | 99.97 | | | 0.03 |
| 10 (recycle)[1] | 386.0 | 99.87 | 0.09 | <0.01 | 0.02 |
| 11 (recycle) | 320.0 | 99.86 | 0.09 | <0.01 | 0.01 |
| 12 (recycle) | 342.0 | 99.85 | 0.13 | <0.01 | 0.01 |
| 13 (recycle) | 316.0 | 99.72 | 0.16 | 0.03 | 0.07 |
| 14 (recycle) | 293.0 | 99.59 | 0.18 | 0.05 | 0.14 |
| 15 (recycle) | 328.0 | 99.14 | 0.41 | 0.02 | 0.27 |
| 16 (recycle) | 337.0 | 99.70 | 0.16 | 0.03 | 0.03 |
| 17 (recycle)[2] | 356.0 | 98.54 | 0.26 | 0.16 | 0.63 |
| 18 (recycle)[2] | 320.0 | 99.44 | 0.15 | 0.43 | 1.21 |

[1] After Run 9, 90% of the combined mother liquor-toluene wash was purified by distillation prior to its use in Run 10.
[2] Runs 17 and 18 exhibited unsatisfactory wringing and washing characteristics, probably because of the accumulation of impurities, e.g., p-phenylbenzoic acid, for which the product was not analyzed.

Samples of the mother liquors obtained from each of the runs in this series were analyzed. The amounts of reaction by-products in these samples are set forth in Table V.

TABLE V

[Reaction by-products based on toluene-free benzoic acid mother liquors]

| Mother liquor obtained from run | Analysis of toluene-free benzoic acid mother liquor, percent | | | | | | |
|---|---|---|---|---|---|---|---|
| | Benzaldehyde | Benzyl alcohol | Phthalic anhydride | 2-methyl-diphenyl | 3-methyl-diphenyl | Benzyl benzoate | Unknowns |
| 1 | 3.1 | 0.5 | 0.1 | 0.5 | 0.4 | 3.4 | 1.0 |
| 2 | 2.9 | 0.3 | 0.2 | 0.8 | 0.5 | 4.0 | 1.1 |
| 3 | 3.2 | 0.3 | 0.3 | 0.9 | 0.5 | 4.0 | 1.5 |
| 4 | 2.5 | 0.4 | 0.4 | 0.9 | 0.4 | 4.2 | 1.4 |
| 5 | 2.9 | 0.3 | 0.5 | 0.9 | 0.4 | 4.5 | 1.6 |
| 6 | 3.2 | 0.2 | 0.5 | 1.0 | 0.4 | 4.7 | 1.3 |
| 7 | 2.6 | 1.6 | 0.8 | 1.2 | 0.4 | 4.0 | 2.0 |
| 8 | 3.4 | 0.4 | 0.7 | 0.9 | 0.3 | 4.3 | 1.9 |
| 9 | 3.1 | 2.7 | 0.7 | 0.8 | 0.3 | 5.0 | 2.2 |
| 10 | 2.5 | 0.6 | 0.5 | 1.0 | 0.4 | 1.9 | 1.4 |
| 11 | 2.9 | 0.8 | 0.6 | 1.2 | 0.5 | 2.7 | 1.3 |
| 12 | 3.0 | 0.7 | 0.9 | 1.2 | 0.4 | 3.8 | 1.5 |
| 13 | 3.3 | 0.5 | 1.0 | 1.4 | 0.6 | 5.2 | 2.1 |
| 14 | 3.0 | 0.5 | 1.0 | 1.5 | 0.5 | 7.0 | 1.5 |
| 15 | 2.6 | 0.5 | 0.9 | 1.1 | 0.4 | 6.7 | 1.0 |
| 16 | 3.0 | 0.3 | 0.9 | 1.4 | 0.5 | 5.6 | 1.0 |
| 17 | 2.9 | 0.4 | 1.0 | 1.4 | 0.6 | 4.8 | 1.1 |
| 18 | 2.9 | 0.4 | 0.9 | 1.4 | 0.6 | 3.8 | 1.4 |

EXAMPLE 4

Using the procedures described in Example 1, but using manganese octoate instead of cobalt octoate as the catalyst, a series of runs was carried out in which recovered mother liquors, 50% of which has been purified by distillation, were oxidized at 150°–155° C. using air at the rate of 2.5 cubic feet per hour at pressure of 55 pounds per square inch until 35 percent of the toluene was converted to benzoic acid. The amounts of crystalline benzoic acid recovered in seven consecutive runs and the analysis of the products are set forth in Table VI.

Distillation of the products of these runs by the procedure described in Examples 1 and 2 gave nearly quantitative yields of products that contained more than 99.9 percent of benzoic acid and substantially no high boiling impurities.

TABLE VI

[Series of runs for the preparation of crystalline benzoic acid using manganese octoate as catalyst and purifying 50% of the mother liquor prior to recycling]

| Run number | Amount of benzoic acid isolated (grams) | Analysis of product by vapor phase chromatography, percent | | | |
|---|---|---|---|---|---|
| | | Benzoic acid | Toluene | Diphen-yls | Benzyl benzoate |
| 1 | 347 | 99.85 | 0.11 | 0.02 | 0.02 |
| 2 (recycle) | 361 | 99.86 | 0.04 | <0.005 | 0.05 |
| 3 (recycle) | 380 | 99.86 | 0.06 | <0.005 | 0.06 |
| 4 (recycle) | 376 | 99.52 | 0.09 | 0.06 | 0.03 |
| 5 (recycle) | 360 | 99.69 | 0.11 | 0.01 | 0.06 |
| 6 (recycle) | 324 | 99.64 | 0.21 | 0.01 | 0.08 |
| 7 (recycle) | 262 | 98.85 | 0.24 | 0.11 | 0.64 |

NOTE.—The oxidation in Run 7 took place very slowly (12 hours versus the usual 5.5 hours when a manganese catalyst is used), probably because of the accumulation of impurities, e.g., p-phenylbenzoic acid, for which the product was not analyzed.

COMPARATIVE EXAMPLE

Using the procedures described in Example 1, a series of runs was carried out in which recovered mother liquors which had not been purified were oxidized at 150°–155° C. using air at the rate of 2.5 cubic feet per hour at the pressure of 55 pounds per square foot until 35 percent of the toluene had been converted to benzoic acid. The amounts of crystalline benzoic acid recovered in seven consecutive runs and the analysis of the products are set forth in Table VII.

TABLE VII

[Series of runs for the preparation of crystalline benzoic acid in which the mother liquors were not purified prior to recycling]

| Run number | Amount of benzoic acid isolated (grams) | Analysis of product by vapor phase chromatography, percent | | | |
|---|---|---|---|---|---|
| | | Benzoic acid | Toluene | Diphen-yls | Benzyl benzoate |
| 1 | 405 | 99.96 | | 0.01 | 0.03 |
| 2 (recycle) | 423 | 99.61 | 0.16 | 0.09 | 0.07 |
| 3 (recycle) | 396 | 99.70 | 0.10 | 0.09 | 0.08 |
| 4 (recycle) | 432 | 98.52 | 0.13 | 0.43 | 0.43 |
| 5 (recycle) | 445 | 98.42 | 0.17 | 0.30 | 0.43 |
| 6 (recycle) | 393 | 98.90 | 0.17 | 0.22 | 0.37 |
| 7 (recycle) | 284 | 97.55 | 0.12 | 0.41 | 0.94 |

From the data in Table VII, it will be seen that the benzoic acid contents of the products fell below 99 percent after the third run. In addition, the isolation and washing of the products became difficult at this point.

Distillation of the products of Runs 2 and 3 of this series by the procedure described in Examples 1 and 2 yielded products that contained more than 99.8 percent of benzoic acid and very small amounts of high boiling impurities. The products obtained by the distillation of the products of Runs 4 through 7 contained less than 99.5 percent of benzoic acid with most of the impurities present being phthalic anhydride, benzyl benzoate, methyldiphenyls, and other high boiling compounds.

The terms and expressions that have been employed are used as terms of description and not of limitation. There is no intention in the use of such terms and expressions of excluding any equivalents of the features shown and described or portions thereof. It is recognized that various modifications are possible within the scope of the invention claimed.

What is claimed is:

1. An integrated process for the production and purification of benzoic acid that comprises the following sequential steps:
    (a) contacting in a reactor a feedstock comprising toluene and a heavy metal oxidation catalyst with an oxygen-containing gas in the liquid phase at a temperature in the range of about 130° C. to 200° C. and a pressure in the range of about 20 p.s.i. to 100 p.s.i., until 25 percent to 45 percent of the toluene has been converted to benzoic acid;
    (b) cooling the reaction mixture to a temperature below about 50° C.;
    (c) separating the crystallized benzoic acid from the mother liquor;
    (d) washing the crystalline benzoic acid with toluene and drying it;
    (e) distilling the crystalline benzoic acid at a pressure in the range of about 50 mm. to 760 mm. and recovering a toluene fraction and a benzoic acid fraction;
    (f) combining the mother liquor from step (c) with the toluene wash from step (d) and the recovered toluene fraction from step (e) to form a combined liquor;
    (g) separating the combined liquor into a first portion containing from 10 percent to 100 percent of the combined liquor and a second portion containing from 0 to 90 percent of the combined liquor;
    (h) distilling the first portion of the combined liquor under a pressure of about 50 mm. to 200 mm. to about 200° C. to 225° C.;
    (i) charging the distillate from step (h) and the second portion of the combined liquor (step (g)) to the reactor; and
    (j) repeating steps (a) through (i).

2. The process of claim 1 wherein the oxidation of toluene (step (a)) is effected at a temperature in the range of 150° C. to 175° C. and a pressure in the range of 50 p.s.i. to 75 p.s.i.

3. The process of claim 1 wherein the oxidation of toluene (step (a)) is continued until about 35 percent of the toluene has been converted to benzoic acid.

4. The process of claim 1 wherein in step (a) the oxygen-containing gas is oxygen and the catalyst is cobalt octoate.

5. The process of claim 1 wherein in step (b) the reaction mixture is cooled to room temperature.

6. The process of claim 1 wherein in step (e) the crystalline benzoic acid is distilled under a pressure of about 100 mm.

7. The process of claim 1 wherein the reaction mixture obtained from step (a) is cooled to a temperature in the range of 80°–90° C., removed from the reactor, heated to dissolve precipitated solids, and then cooled to a temperature below about 50° C.

8. The process of claim 1 wherein in step (g) each of the portions contains about 50 percent of the combined liquor.

9. The process of claim 1 wherein in step (h) the distillation is carried out under a pressure of about 100 mm.

References Cited

UNITED STATES PATENTS 3,210,416   10/1965   Fragenn et al. .......... 260—524
3,362,989   1/1968    McMakin, Jr., et al. ... 260—525
1,694,124   12/1928   Jaeger ................. 260—525

LORRAINE A. WEINBERGER, Primary Examiner

P. J. KILLOS, Assistant Examiner

U.S. Cl. X.R.

260—525